United States Patent
Andersen et al.

(10) Patent No.: US 9,582,678 B2
(45) Date of Patent: *Feb. 28, 2017

(54) METHOD FOR SECURE STORING OF A DATA FILE VIA A COMPUTER COMMUNICATION NETWORK

(75) Inventors: Trond Andersen, Tromso (NO); Anders Andersen, Tromso (NO); Anders Mathisen, Olderdalen (NO); Terje Wold, Tromso (NO)

(73) Assignee: INVENIA AS, Tromso (NO)

(*) Notice: Subject to any disclaimer, the term of this patent is extended or adjusted under 35 U.S.C. 154(b) by 540 days.

This patent is subject to a terminal disclaimer.

(21) Appl. No.: 14/394,568

(22) PCT Filed: Apr. 19, 2012

(86) PCT No.: PCT/NO2012/050071
§ 371 (c)(1),
(2), (4) Date: Jan. 27, 2015

(87) PCT Pub. No.: WO2012/144909
PCT Pub. Date: Oct. 26, 2012

(65) Prior Publication Data
US 2015/0161410 A1  Jun. 11, 2015

(51) Int. Cl.
*G06F 21/00* (2013.01)
*G06F 21/62* (2013.01)
(Continued)

(52) U.S. Cl.
CPC .... *G06F 21/6218* (2013.01); *G06F 17/30342* (2013.01); *H04L 9/0863* (2013.01);
(Continued)

(58) Field of Classification Search
CPC .......... G06F 2211/007; G06F 2211/008; H04L 9/28; H04L 2463/062; H04L 9/06; H04L 9/08; H04L 9/30; H04L 63/04
(Continued)

(56) References Cited

U.S. PATENT DOCUMENTS 6,151,676 A * 11/2000 Cuccia ................. H04L 9/3013
380/259
2002/0199119 A1* 12/2002 Dunnion ................. H04L 12/58
726/4

(Continued)

OTHER PUBLICATIONS

International Search Report, dated Sep. 12, 2012, from corresponding PCT application.

*Primary Examiner* — Madhuri Herzog
(74) *Attorney, Agent, or Firm* — Young & Thompson

(57) ABSTRACT

A computer implemented method, server computer and computer program for securely storing a data file via a computer communication network. The method includes: providing a computer device of a user with code for providing a unique user name for the user; asking the user for a password; generating an asymmetric key pair for the user having one public key and one private key; encrypting the private key via the hash of the password; generating a file-specific symmetric key specific for the data file; encrypting the data file via the file-specific symmetric key; encrypting the file-specific symmetric key via the public key of the user; where the code is executed by a web browser on the computer device. The server is then receiving the encrypted data file, the encrypted file-specific symmetric key, the encrypted private key of the user and the public key of the user from the computer device.

18 Claims, 14 Drawing Sheets

(51) Int. Cl.
*H04L 29/06* (2006.01)
*H04L 29/08* (2006.01)
*G06F 17/30* (2006.01)
*H04L 9/08* (2006.01)

(52) U.S. Cl.
CPC ........ *H04L 63/045* (2013.01); *H04L 63/0457* (2013.01); *H04L 63/06* (2013.01); *H04L 63/061* (2013.01); *H04L 63/083* (2013.01); *H04L 67/06* (2013.01); *H04L 67/1097* (2013.01); *H04L 67/146* (2013.01)

(58) Field of Classification Search
USPC ................ 713/150–151, 164–167, 189–194; 380/255–262, 277–30
See application file for complete search history.

(56) References Cited

U.S. PATENT DOCUMENTS

| | | | | |
|---|---|---|---|---|
| 2003/0016829 A1* | 1/2003 | Chu | ........................ | G06F 21/10 380/281 |
| 2007/0100913 A1* | 5/2007 | Sumner | ............... | G06F 11/1453 |
| 2007/0269041 A1 | 11/2007 | Bhatnagar et al. | | |
| 2009/0063860 A1 | 3/2009 | Barnett et al. | | |
| 2009/0106561 A1* | 4/2009 | Ejiri | ........................ | G06F 21/62 713/193 |

* cited by examiner

METHOD FOR SECURE STORING OF A DATA FILE VIA A COMPUTER COMMUNICATION NETWORK

FIELD OF THE INVENTION

The present invention relates to a method for secure storing of a data file via a computer communication network, and a server computer and a computer program implementing the method.

BACKGROUND OF THE INVENTION

There are several known technologies for online storing and sharing of data files. For example a service may provide server capacity, where registered users can transfer data files between their personal/work computer device and the server via internet for backup of data files, for sharing data files, for collaboration on data files, for synchronisation of data files etc. Some service providers use encryption methods when transferring files between the server and the computer device of the user.

The encrypted transfer of a file between the computer device and the server often uses a protocol like the Hypertext Transfer Protocol Secure (HTTPS) to encrypt the transfer of a data file from the computer device to the server. Hence, the server receives an encrypted file, but when received, the data file is decrypted and the data file is stored unencrypted. A person with administration privileges on the server will easily have access to the data file.

This type of technology has several disadvantages. First of all, many service providers require that an application has to be downloaded and installed on each computer device used to connect to the servers. This may be cumbersome; in addition, the user may not have privileges on the computer device to install applications.

Some service providers also offer a system with the possibility of encrypting the data file before transferring the file to the server, and storing of the data file encrypted on the server. In order to share the data file, the encryption key must be stored together with the encrypted data file. Again, a person with administrator privileges may then access the file. Alternatively, no encryption key is stored on the server; however, no sharing of the data file is then possible.

One object of the present invention is to provide a method and system for secure storing of a data file via a computer communication network, which can be used even if the user does not have administrator privileges on his computer and without the need for installation of a separate application. Moreover, one object is to provide that the data files are kept continuously encrypted from the time when the data file is leaving the computer device of the user and to the time when the same or another computer device is receiving the data file from the server. In this way it is avoided that a person with administration privileges has access or can get access to the unencrypted data file. Moreover, if a hacker breaks into the server, he/she will not get access to the data files as well.

Another object is to provide a method and system where the user can give access to the data file to other users.

SUMMARY OF THE INVENTION

The present invention relates to a computer implemented method for secure storing of a data file via a computer communication network, comprising the steps of:
providing a computer device of a user with code for:

providing a unique user name for the user;
asking the user for a password;
generating an asymmetric key pair for the user having one public key and one private key;
encrypting the private key of the user by means of a hash of the password, resulting in an encrypted private key;
generating a file-specific symmetric key specific for the data file;
encrypting the data file by means of the file-specific symmetric key, resulting in an encrypted data file;
encrypting the file-specific symmetric key by means of the public key of the user, resulting in an encrypted file-specific symmetric key;

where the code is executed by a web browser on the computer device;
receiving the encrypted data file, the encrypted file-specific symmetric key, the encrypted private key of the user and the public key of the user from the computer device;
storing the encrypted data file and the encrypted file-specific symmetric key in a file management system;
storing the public key of the user and the encrypted private key of the user in a user management system.

In one aspect, the method comprises the steps of:
providing the computer device of the user with code for:
generating an information file with information about the data file;
encrypting the information file by means of the file-specific symmetric key;

where the code is executed by the web browser on the computer device;
receiving the encrypted information file; and
storing the encrypted information file in the file management system.

In one aspect, the information about the data file comprises at least one of the following elements: a file creation date, a file name, a unique file identifier, created timestamp, modified timestamp, and a file size.

In one aspect, the method comprises the steps upon receiving a login request comprising the unique user name from the computer device:
identifying the user by means of the unique user name;
generating a unique session-ID;
encrypting the session-ID by means of the public key of the user;
sending the encrypted private key of the user to the computer device;
sending the encrypted session-ID to the computer device;
providing the computer device of the user with code for:
asking the user for the password;
decrypting the encrypted private key by means of the hash of the password;
decrypting the encrypted session-ID by means of the private key;

where the code is executed by the web browser on the computer device;
receiving the session-ID from the computer device;
comparing the received session-ID with the generated session-ID;
accepting the login request if the received session-ID is identical to the generated session-ID.

In one aspect, the method comprises the steps of, upon receiving a data file request from the computer device:
sending the encrypted data file to the computer device;
sending the encrypted file-specific symmetric key to the computer device;

providing the computer device with code for:
    decrypting the encrypted file-specific symmetric key by means of the private key;
    decrypting the encrypted data file by means of the decrypted file-specific symmetric key;
where the code is executed by the web browser on the computer device.

In one aspect, the method further comprises the steps of:
sending the encrypted information file to the computer device;
providing the computer device with code for:
    decrypting the encrypted information file by means of the decrypted file-specific symmetric key;
where the code is executed by the web browser on the computer device.

In one aspect, the method comprises the steps of:
receiving a contact request from the computer device of the user for establishing contact between the user and a further user;
sending a confirmation request to the further user;
receiving an acceptance of the confirmation request from the further user;
storing contact information about the contact between the user and the further user in the user management system.

In one aspect, the method comprises the steps of:
providing the computer device of the user with code for:
    providing an indication of which data file to share;
    providing an indication of a further user to share the data file with;
where the code is executed by the web browser on the computer device;
receiving the indication of which data file to share and the indication of the further user to share the data file with;
sending the public key of the further user to the computer device;
sending the encrypted file-specific symmetric key for the data file to the computer device;
providing the computer device of the user with code for:
    decrypting the encrypted file-specific symmetric key by means of the private key;
    encrypting the decrypted file-specific symmetric key as a further file-specific symmetric key by means of the public key of the further user;
where the code is executed by the web browser on the computer device;
receiving the encrypted further file-specific symmetric key;
    storing the encrypted further file-specific symmetric key in the file management system.

In one aspect, the method comprises the steps of, upon receiving a data file request from the computer device of the further user:
sending the encrypted data file to the computer device;
sending the encrypted further file-specific symmetric key to the computer device;
providing the computer device with code for:
    decrypting the encrypted further file-specific symmetric key by means of the private key;
    decrypting the encrypted data file by means of the decrypted further file-specific symmetric key;
where the code is executed by the web browser on the computer device.

In one aspect, the method comprises the steps of:
providing the computer device of the user with code for:
    providing an indication of which data file to share;
    asking the user for an e-mail address of a non-registered user to share the data file with;
    generating a password for the non-registered user;
    sending the password to the non-registered user;
    providing a hash of the password of the non-registered user by means of a hash function;
    generating a file-specific symmetric key specific for the data file;
    encrypting the file-specific symmetric key by means of the password;
where the code is executed by the web browser on the computer device;
    receiving the indication of which data file to share, the e-mail address, the hash of the password and the encrypted file-specific symmetric key;
    sending an e-mail to the e-mail address of the non-registered user containing a link to a page on the server;
where, when the non-registered user is opening the link, the server is providing the non-registered user with code for:
    asking the non-registered user for the e-mail address and the password;
    providing a hash of the password by means of the hash function;
where the code is executed by the web browser on the computer device of the non-registered user;
    receiving the e-mail address and the hash of the password from the non-registered user;
    generating a unique session-ID;
    encrypting the session-ID by means of the hash of the password of the non-registered user;
    sending the encrypted session-ID to the computer device of the non-registered user;
    providing the non-registered user with code for:
        decrypting the encrypted session-ID by means of the hash of the password;
where the code is executed by the web browser on the computer device;
    receiving the session-ID from the computer device of the non-registered user;
    comparing the received session-ID with the generated session-ID;
    sending the encrypted file-specific symmetric key and the encrypted data file to the computer device of the non-registered user if the received session-ID is identical to the generated session-ID;
    providing the non-registered user with code for:
        decrypting the encrypted file-specific symmetric key by means of the password;
        decrypting the encrypted data file by means of the decrypted file-specific symmetric key;
where the code is executed by the web browser on the computer device.

In one aspect, the password is sent to the non-registered user by means of an e-mail application installed on the computer device of the user.

In one aspect, the password is sent to the non-registered user by means of a SMS, MMS or similar service.

The invention also relates to a server computer, configured to perform a method as set forth above.

The invention also relates to a computer program, comprising processing instructions which enables a server computer to perform a method as set above.

DETAILED DESCRIPTION

Embodiments of the invention will now be described in detail with reference to the enclosed drawings, where:

DEFINITIONS

The term "computer device" is here used to denote any type of electronic device which can be connected to Internet, and which can read, open, change or store a data file. This would typically be a stationary or portable computer, a laptop, a notebook, a mobile phone, a smart phone, an internet tablet, a smart TV or similar type of device.

The term "data file" is here used to denote any type of electronic information which can be stored on a computer device and a server, for example text documents, spreadsheets, presentations, multimedia files (images, music, movies etc), computer source code etc. It should be noted that a folder can also be considered as a data file.

The term "web browser" is here used to denote a computer application which is installed on the computer device and which the user can use to retrieve, present and traverse information resources on the World Wide Web/internet. The web browser would typically be Internet Explorer, Mozilla FireFox, Safari, Opera, Google Chrome, Chromium or other web browsers.

The term "server" is here used to denote a computer server which the user can interact with by using the web browser installed on the computer device. The server comprises a web service and a file handling service for storing and organizing data files, as will be apparent from the description below. The server may comprise one physical computer server, but may also comprise several servers connected to each other.

Figure 1:
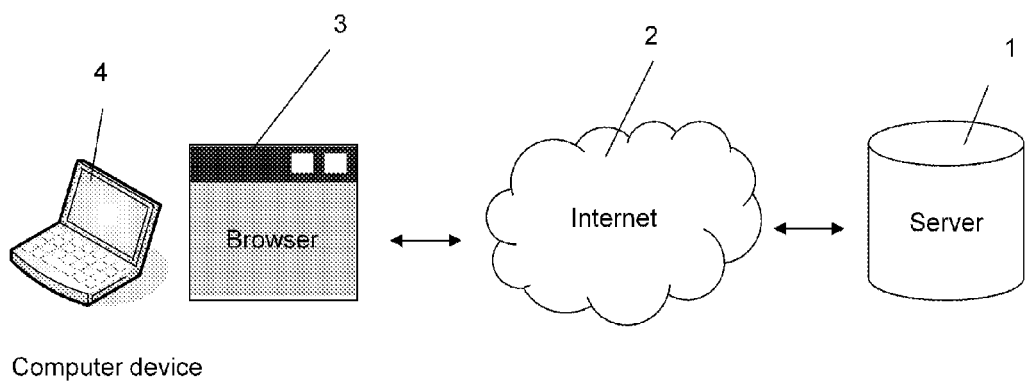
FIG. 1 is a schematic block diagram illustrating principles of the communication of the present invention.

It is now referred to FIG. 1, illustrating a first embodiment of a computer implemented method for secure storing of a data file on a server 1 via a computer communication network 2, typically the internet. In FIG. 1, it is shown communication via internet 2 between the server 1 and a web browser 3 installed on a computer device 4.

In the description below, the embodiment is viewed from the server 1. In an aspect, the disclosed computer-implemented method is performed by the server 1, e.g. by a processing device included in the server 1.

Initially, the user is opening the web browser 3 on the computer device 4 and is directing the web browser to the domain name or IP address of the server 1, for example http://www.example.com.

In return of the request, the server 1 is providing the computer device 4 with code by sending the code to the web browser via internet, after which the code is executed by the web browser 3 on the computer device 4. The code comprises some information, typically in the form of information files (html/xml files) and/or appearance controlling files (css-stylesheets). Moreover, the code comprises code that can be executed by the web browser, for example ECMA-script code, commonly known as JavaScript or Jscript. Today, JavaScript code is the only option for cross browser support. However, it could also be possible to implement the code as VBScript code that can be executed in Internet Explorer by Microsoft. There could be other alternatives as well. Hence, it is possible to perform the computer-implemented method without installing a separate software application on the computer device. Alternatively, the code could be provided as a plug-in for the web browser by using an API (Application Programming Interface) for the web browser. Such APIs are known for web browsers like Google Chrome, Internet Explorer, Mozilla Firefox and others. Such plug-ins can most often be installed on the computer device without administrator privileges.

First a registration process of the user on the server will be described.

The code executed by the web browser first provides a unique user name for the user. The unique user name may be the e-mail address of the user, which per se is unique. Alternatively, the user name can be automatically generated by the code itself, random functions. In yet an alternative, the user may suggest his/her own user name.

The code executed by the web browser may then perform a check whether the user name is unique, by sending a request to the server 1 to check if the user name already has been registered or not. If the user name has already been registered it is per se not unique, and the user is required to provide another user name.

The code executed by the web browser is then asking the user for a password. The password is not transferred to the server 1.

The code executed by the web browser is then generating an asymmetric key pair for the user having one public key and one private key. The algorithm for generating such asymmetric key pairs is considered known for the skilled person. For example the open source project GNU PGP (http://www.gnupg.org/) provides source code for such key generation in the C programming language.

The code executed by the web browser is then encrypting the private key of the user by means of a hash of the password and produces an encrypted private key. Hence, the private key is only accessible from the encrypted private key by knowing the password. Hash functions are commonly used to generate a hash of a string, such as a password. Such hash functions are considered known for a person skilled in the art, for example SHA1, MD5 etc.

The code executed by the web browser is initiating and performing the transfer of files to the server. Hence, the server is receiving the encrypted private key of the user and the public key of the user from the computer device.

The encrypted private key of the user and the public key of the user are then stored in a user management system of the server.

Thereafter, a data file transferring process will be described. Often, the first data file transferring process will be performed together with the registration process above.

The code executed by the web browser is then requesting the user for the data file which is to be securely stored on the server 1 via the computer communication network 2.

The code executed by the web browser is then generating a file-specific symmetric key which is specific for the data file. The file-specific key is hence unique. The process of generation of a symmetric key is also known for a person skilled in the art. Known algorithms for the generation of a symmetric key are Blowfish, AES, Triple-DES, etc. The probability of generating two identical symmetric keys is very low, so there is no need to check for other symmetric keys. Of course, such a check could be performed.

The code executed by the web browser is then encrypting the data file by means of the file-specific symmetric key. Hence, the result is an encrypted data file.

The code executed by the web browser is then encrypting the file-specific symmetric key by means of the public key of the user. Hence, the result is an encrypted file-specific symmetric key which can only be decrypted with the private key of the user.

The server is then receiving the encrypted data file and the encrypted file-specific symmetric key. If this data transfer process is performed together with the registration process, also the encrypted private key of the user and the public key of the user will be transferred to the server from the computer device, in order to transfer all files and keys at the same time. It should be noted that in the description above, the keys themselves may be considered as "files" stored on the computer device, either in the memory (RAM) or on a hard disc etc.

Hence, the code executed by the web browser is initiating and performing the transfer of these files (data files and encrypted/non-encrypted key files) from the computer device to the server.

The encrypted data file and the encrypted file-specific symmetric key is then stored in a file management system. Again, if this data transfer process is performed together with the registration process, the he encrypted private key of the user and the public key of the user are then stored in the user management system.

Since many of the above steps related to the key generation and encryption are performed by executing the code in the web browser on the computer device, the server itself will only contain encrypted data files, private keys of the users and the file-specific symmetric keys. Hence, a person having access to the server does not have access to the content of these files.

It should be noted that the registration process of a user and data file transfer process of transferring a data file from the computer device 4 to the server 1 do not have to be performed simultaneously. The user may use the web browser on the computer device to register at the server in a first operation before the user logs out. The user may then in a second, subsequent operation log in, and then select and transfer the data from the computer device to the server.

According to the embodiment described above, the user may now use a web browser on a further computer device, which is different from the computer device used for the registration process and the data file transfer process above, and direct the web browser on the further computer device to the domain name or IP address of the server 1 and perform a login and transfer data files from the further computer device to the server 1 or to transfer data files from the server 1 to the computer device.

The login process will now be described. Upon receiving a login request comprising the unique user name from a computer device 4, the following steps are performed on the server.

First, the user is identified by means of the unique user name. Then a unique session-ID is generated. The session-ID is for example generated by means of random function, alternatively a check may be performed with respect to other session-IDs. As described above, the public key and the encrypted private key have been stored in the user management system of the server. The session-ID is also stored in the user management system of the server.

The session-ID is encrypted by means of the public key of the user. Then the encrypted private key of the user and the encrypted session-ID are sent to the computer device.

Together with these files, the server 1 is providing the computer device 4 with code by sending the code to the web browser via internet, where after the code is executed by the web browser 3 on the computer device 4.

The code executed by the web browser is then asking the user for the password. If the password is correct, the encrypted private key is decrypted by means of a hash of the password, and the encrypted session-ID is decrypted by means of the private key.

The code executed by the web browser is now sending the session-ID to the server. Hence, the server is receiving the session-ID from the computer device. The server is then comparing the received session-ID with the generated session-ID stored in the user management system, and the login request is accepted if the received session-ID is identical to the generated session-ID. When the login has been accepted, the server is sending information files and code that can be executed by the web browser to the computer device, for the web browser to show a user interface. In the user interface the files and folders on the server belonging to the user or being shared with the user are shown. Moreover, there are possibilities to select files stored on the server and transferring them to the computer device and there are also possibilities to select files on the computer device and transferring them to the server.

A data file transfer process for transferring a file from the server to the computer device will now be described. Upon receiving a data file request from the computer device, the server performs the following steps. First, the encrypted data file and the encrypted file-specific symmetric key are sent to the computer device. Then, the server is providing the computer device with code that can be executed by the web browser on the computer device.

The code executed by the web browser is decrypting the file-specific symmetric key by means of the private key. The private key was obtained by the login process described above. Then, the data file is decrypted by means of the decrypted file-specific symmetric key. The user may then be asked whether the data file should be opened or stored on the computer device.

In the description above, there are two options with respect to the name of the data file. The code executed by the web browser may give the encrypted data file a name equal to or similar to the data file itself. It would then be relatively easy for the user to recognise the correct file on the server when the user wants to transferring it back from the server to the computer device or to a further computer device. However, this file name will be viewable on the server by a person having administrator privileges, and sometimes, the name of a data file itself may contain sensitive or secret information. Hence, an alternative would be to change the name of the data file during the encryption. The disadvantage would then be that it is difficult for the user to separate the different files from each other.

An information file with information about the data file can be used for this purpose. During the data file transferring process of transferring a data file from the computer device to the server, the computer device is provided with code that can be executed by the web browser on the computer device.

The code executed by the web browser is first generating an information file with information about the data file. Then the information file is encrypted by means of the file-specific symmetric key as described above with respect to the data file transfer process.

The code executed by the web browser is then sending the encrypted information file to the server. Hence, the server is receiving the encrypted information file together with the encrypted data file and the encrypted file-specific symmetric key. If this is performed during the registration process, also the encrypted private key of the user and the public key of the user are received by the server. The encrypted information file is also stored in the file management system.

The information file may comprise information about the data file, such as a file creation date, a file name, a unique file identifier, created timestamp, modified timestamp, size etc. Hence, the file name is stored encrypted on the server as a part of the encrypted information file.

After a login process, the server is sending the encrypted information file to the computer device together with the other files as described above. Moreover, in addition to the code described above with respect to the login process, the computer device is also provided with code for execution by the web browser on the computer device for decrypting the encrypted information file by means of the decrypted file-specific symmetric key.

Hence, the file name can be shown to the user in the user interface in the web browser, and it is easy for the user to separate the data files from each other.

Above it has been described how a user can use web browsers on different computer devices to access encrypted data files on a server, where a person having administrator privileges on the server cannot access the encrypted data files.

It is further possible to share files between different users, which will be described further in detail below. Here, additional functions are provided as a part of the user interface of the web browser after a login has been performed.

The server is, as described above, providing the computer device with code that can be executed by the web browser on the computer device.

The code executed by the web browser is providing the possibility for the user to provide an indication of which data file the user wants to share. Moreover, the user may provide an indication of a further user, i.e. a user different from himself/herself, to share the data file with. The further user may for example be selected from a list, or there may be a search option to search for names etc.

The code executed by the web browser is then sending these indications to the server. Hence, the server is receiving the indication of which data file to share and the indication of the further user to share the data file with.

The server is then sending the public key of the further user and the encrypted file-specific symmetric key for the data file to the computer device.

The code executed by the web browser is then decrypting the file-specific symmetric key by means of the private key. As described above, the private key was transferred to the computer device as part of the login process. Then, the decrypted file-specific symmetric key is encrypted again as a further file-specific symmetric key by means of the public key of the further user. Hence, it is possible for the further user to access the further file-specific symmetric key by using the private key of the further user, as will be described below.

The code executed by the web browser is then sending the encrypted further file-specific symmetric key to the server. Hence, the server is receiving the encrypted further file-specific symmetric key and is storing the encrypted further file-specific symmetric key in the file management system.

When a further user uses the web browser on his/her computer device to login, the further user receives as described above encrypted private key of the further user, which is decrypted by using the further user's password.

Upon receiving a data file request from the computer device of the further user related to the data file shared above, the server performs the following steps. First, the server is sending the encrypted data file and the encrypted further file-specific symmetric key to the computer device. Then the server provides the computer device with code for execution by the browser on the computer device.

The code executed by the web browser is decrypting the encrypted further file-specific symmetric key by means of the private key. Then, the encrypted data file is decrypted by means of the decrypted further file-specific symmetric key. Hence, the further user has access to the shared data file from the user.

There are several ways the further user can be selected. However, it is not always desired that all users registered in the user management system are listed for sharing of data files. Hence, the sharing of files can be restricted to users that have established contact with each other.

The user interface of the web browser may therefore comprise a possibility to establish contact with other users. One requirement can for example be that you are only allowed to establish contacts with someone you know the user name or e-mail address of.

The server is then receiving a contact request from the computer device of the user for establishing contact between the user and a further user. The server is then sending a confirmation request to the further user. The further user will then receive a notice via e-mail and via the user interface upon login, and may choose to accept or not accept the contact request. If the server receives an acceptance of the confirmation request from the further user, the server is storing contact information about the contact between the user and the further user in the user management system. The users may then only share data files with their own contacts.

It should be noted that it is possible to share a data file with more than one further user. The process described above will then be repeated for these further users.

In addition, the user which is sharing the data file may grant different access to the shared data file, for example read-only access, read and write access and read, write and delete access.

Figure 2:
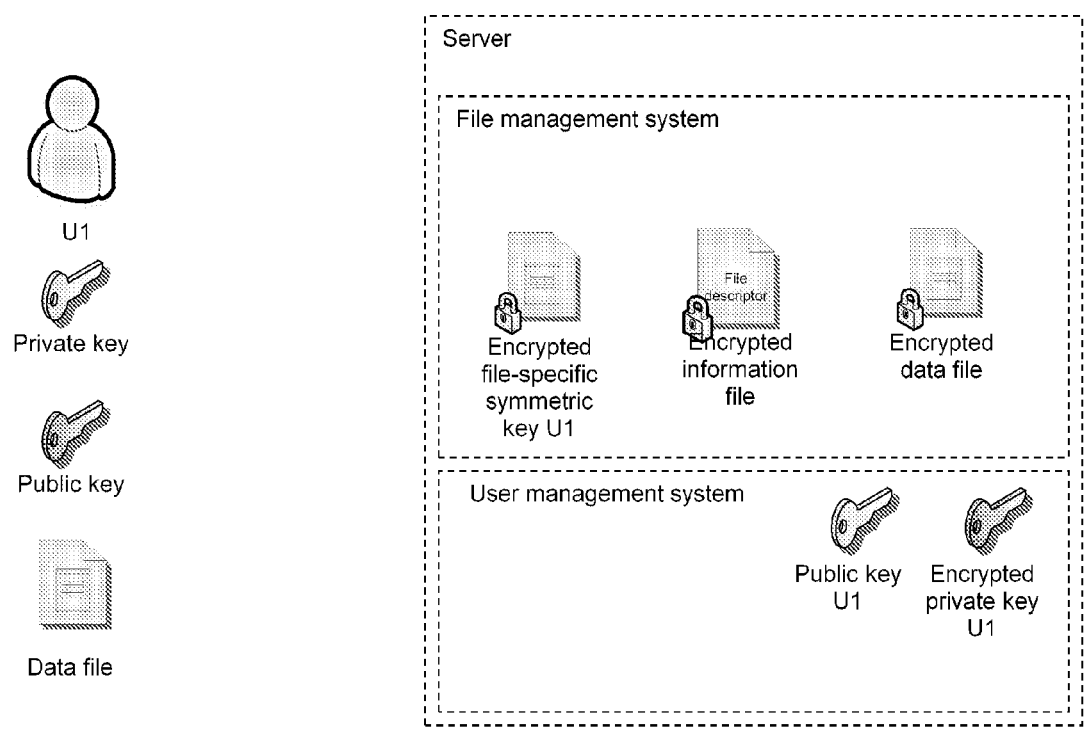
FIG. 2 is a schematic block diagram illustrating files and keys for a first embodiment of the invention.

In FIG. 2 a first embodiment using the methods above is illustrated. A user or first user U1 has a data file, and when registering according to the method described above, a private key and a public key are generated. The file management system of the server is storing the encrypted data file, the encrypted information file and the encrypted file-specific symmetric key for the user U1. The user management system is storing the public key for the user U1 and the encrypted private key for the user U1, of course together with the user name for the user U1.

Figure 3:
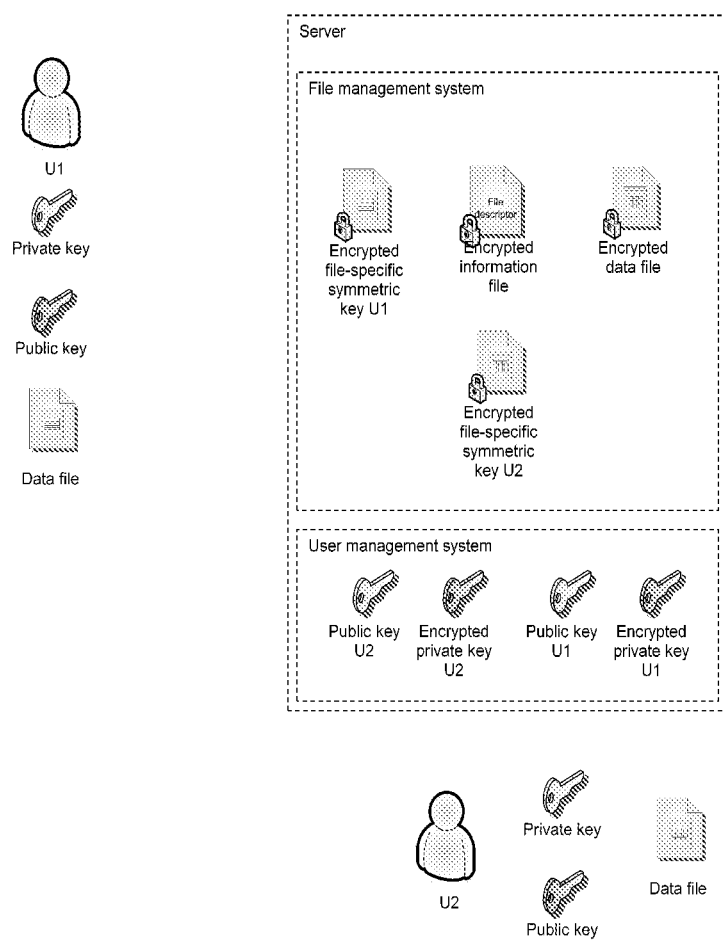
FIG. 3 is a schematic block diagram illustrating files and keys for a second embodiment of the invention.

In FIG. 3 a second embodiment using the methods above is illustrated. Here, a second user U2 is also registered. In addition to the files described above, the file management system is storing a further or second encrypted file-specific key U2 for the second user U2. And in addition to the files described above, the user management system is storing the public key for the user U2 and the encrypted private key for the user U2, of course together with the user name for the user U2. As illustrated, the second user 2 can get access to the data file via the server, but without any possibility for the server to get access to the data file.

It is also possible for a user to share a data file with a non-registered user. In the user interface of the users web browser, for example after the registration process of the user, or after a login process, the user selects a data file and selects to share this file with a non-registered user. Consequently, the code executed by the web browser is providing the user with code for providing an indication of which data file to share.

The code executed by the web browser is then asking the user for an e-mail address of a non-registered user to share the data file with.

The code executed by the web browser is then generating a password for the non-registered user, and is sending the password to the non-registered user. The sending of the password would normally take place at the end of this data file sharing process. The password may be sent to the non-registered user by means of an e-mail application installed on the computer device of the user to avoid that the e-mail containing the password is sent through e-mail servers administrated by the same organization as the server defined above. Alternatively, the password is sent to the non-registered user by means of a SMS, MMS or similar service. In such an alternative, the phone number of the non-registered user should be given together with the email address.

The code executed by the web browser is then providing a hash of the password of the non-registered user by means of a hash function.

The code executed by the web browser is then generating a file-specific symmetric key specific for the data file and is encrypting the file-specific symmetric key by means of the password, in similar way as described above.

The server is then receiving the indication of which data file to share, the e-mail address, the hash of the password and the encrypted file-specific symmetric key. Thereafter, the server is sending an e-mail to the e-mail address of the non-registered user containing a link or URL to a page on the server.

When the non-registered user is opening the link in the web browser, a request is sent to the server. As an answer to the request, the server is providing the non-registered user with code for asking the non-registered user for the email address and the password. This would typically be an input form of the user interface in the browser. It would of course be possible to provide the link in such a way that the email address is filled in advance, i.e. the non-registered user does only have to write is password. It should be noted that as above, the password itself is not sent to the server.

The code executed by the web browser is then providing a hash of the password of the non-registered user by means of the hash function. The hash function is the same as the one above.

The server is then receiving the email address and the hash of the password from the non-registered user.

The server is then generating a unique session-ID and is encrypting the session-ID by means of the hash of the password of the non-registered user. Then, the server is sending the encrypted session-ID to the computer device of the non-registered user.

Moreover, the server is providing the non-registered user with code for being executed by the web browser on the computer device.

The code executed by the web browser is then decrypting the encrypted session-ID by means of the hash of the password. The decrypted session-ID is then sent to the server.

The server is receiving the session-ID from the computer device of the non-registered user, and is then comparing the received session-ID with the generated session-ID.

If the received session-ID is identical to the generated session-ID, the server is sending the encrypted file-specific symmetric key and the encrypted data file to the computer device of the non-registered.

Again, the server is providing the non-registered user with code for being executed by the web browser on the computer device.

The code executed by the web browser is decrypting the encrypted file-specific symmetric key by means of the password and is decrypting the encrypted data file by means of the decrypted file-specific symmetric key. Finally, the non-registered user has access to the data file shared by the registered user.

It should be noted that an information file may also be used when sharing a file with a non-registered user. As described above, the information file has been encrypted by means of the file-specific symmetric key and the encrypted information file is stored in the file management system.

The non-registered user may receive the encrypted information file together with the encrypted data file from the server.

The code executed by the web browser is here decrypting the encrypted information file by means of the password.

In order to further exemplify the process of secure authentication of a user, further user and a non-registered user, and the process of exchanging information file, data file, encryption file key, password and hashed password to respective parties involved in the process of storing and sharing said information the FIGS. 4 to 9 is provided and discussed. The process described in the following does not define error situation, faulty input or other similar incidents. Implementation of the invention will in most practical cases also comprise such features. When the words file, data file, information file, file key, encrypted file key, password, password hash and the like is used in singular form, it is to be understood that the invention also comprise the handling of the same in plurality form.

Figure 4:
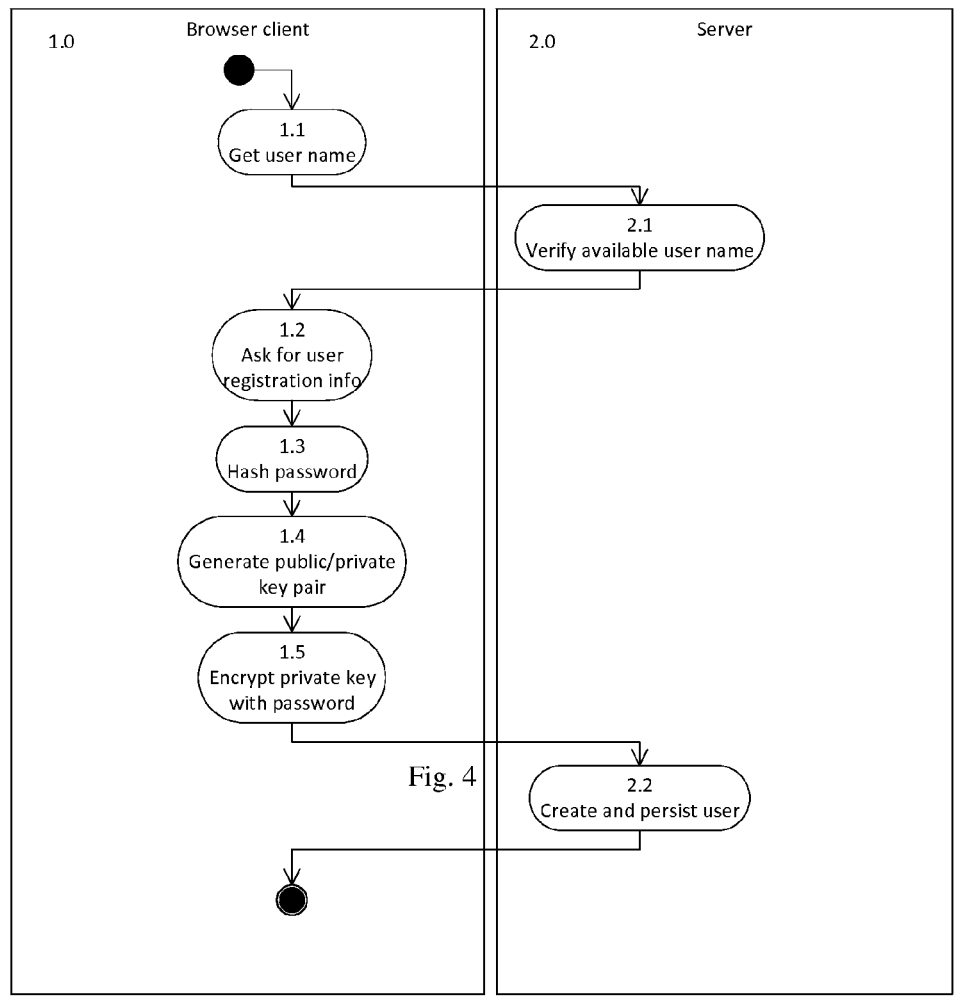
FIG. 4 is a Flow diagram showing the Browser Client-Server communication related to the process of creating a user.

These FIGS. 4-9, shows the information flow when a user has opened a web browser and connected to the server. A number of components are downloaded from the web application server upon start-up of the web application. These components comprise, but are not limited to:

dialogue frames, such as for user registration, login, data and information file up- and download, display and selection of further or non-registered users hash function encryption function file key generator The user's browser client may offer the interface as a web browser interface and the operations concerned with creation of a user are shown in frame 1.0 in FIG. 4. Frame 2.0 in FIG. 4 represents the operations executed on and by the server in communication with the user on the browser client.

This scenario is executed once when the user registers to the service. When the user browser connects to the server and the components of the invention are downloaded to the browser client the user is asked to input a user name (1.1). The server then verifies if this user name is a valid user name, and if the user name is available (2.1).

When the user name is approved the user will be asked to input additional information regarding the authorization process. This information typically includes: Authorization code, Name, Password, Secret Question, Answer to Secret Question and other.

The Password is then handled by the component for Hash, resulting in a hashed password (1.3). The component for Hash can comprise one or more hash functions of any type, for example SHA1.

Once the password is hashed and stored, the component for public-/private key generation (1.4) is executed. This results in a key pair comprising a public key and a private key. These keys can optionally be of 2048 bit length and intended for use in an algorithm like the RSA Algorithm.

The private key then is encrypted (1.5) with a symmetric algorithm using password as input. The hashed password is then stored in a file on the server. Optionally the private key can also be encrypted with the answer to the secret question and stored in a database for use if the user forgets the password.

Finally the server application creates and maintain (2.2) the user entry in the user database.

Although the above scenario is explained as a create new user scenario, it is similarly executed if a user needs to modify the stored information. For such operations the user must first log in as explained below, and then repeat step 1.2 to 1.5. Default values may be presented, alternatively as stored previously.

Figure 5:
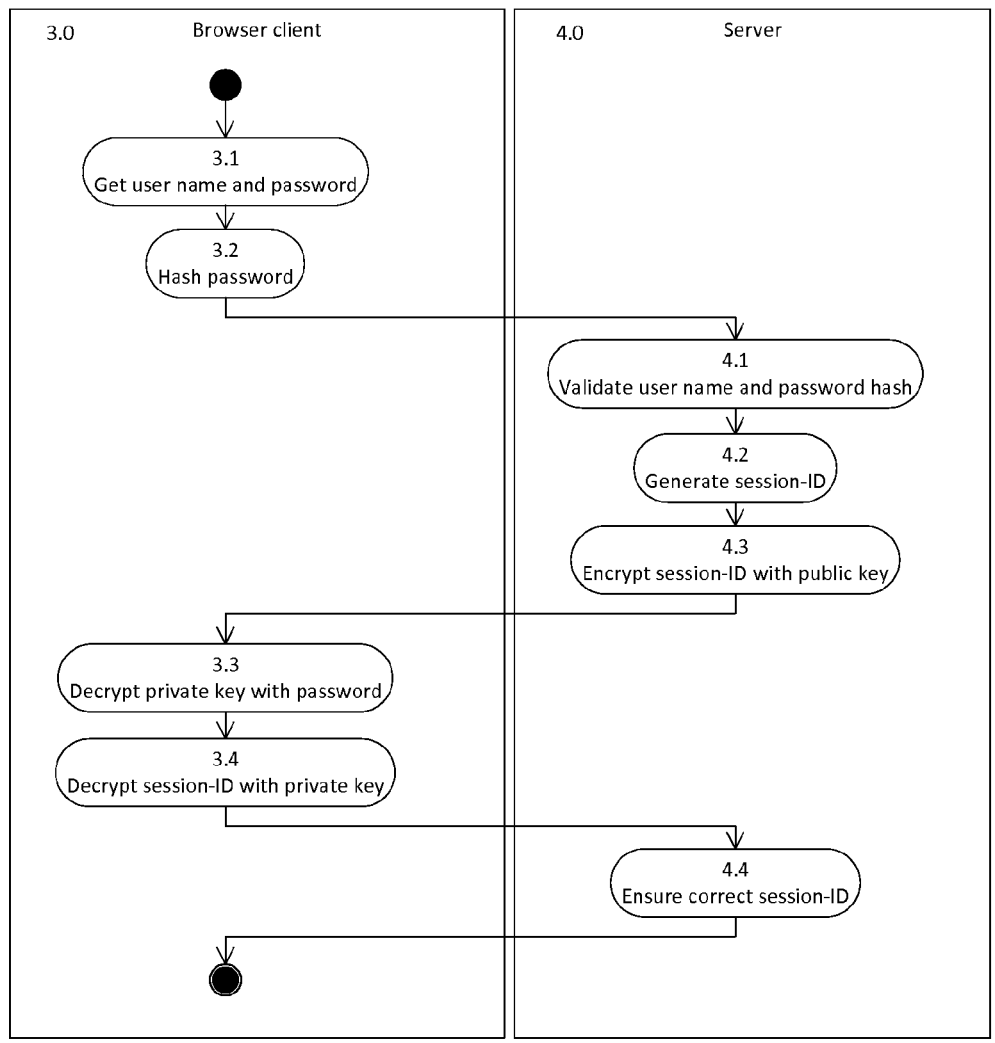
FIG. 5 is a Flow diagram showing the Browser Client-Server communication related to the process of authenticating and logging in the user.

In an embodiment of the invention a previously registered user will when browser navigates to the inventions server application and the components of the invention is downloaded to the browser client, enter the login sequence as defined in FIG. 5. The frames 3.0 and 4.0 represent the communication on the user's browser client and the server respectively.

The user is prompted for user name and password (3.1), and the password is then hashed (3.2), an operation executed on the Browser client computer. The username and the hashed password are validated (4.1) by the server. The server validates this information with previously stored password hash and username (2.2). If the password hash and the username are valid, the server will generate a unique session-ID (4.2) which will be encrypted with the user's public key (4.3). The public key encrypted session-ID will be sent to the browser client, optionally together with the password encrypted private key to be stored by the server.

Browser client then decrypts the password encrypted private key (3.3) using the password if the private key was received from the server. Authentication of the user is ensured when the user public key encrypted (4.3) session-ID is decrypted with the user private key (3.4) and returned in clear text to the server. The server then verifies and ensures (4.4) that the session-ID is correctly decrypted by the user by comparing it with the generated session-ID (4.2). Correct received session-ID verifies that the user is authenticated, and the user is considered to be logged in, and the user is allowed to use the services offered by the server to the user through the invention components running on the browser client.

Figure 6:
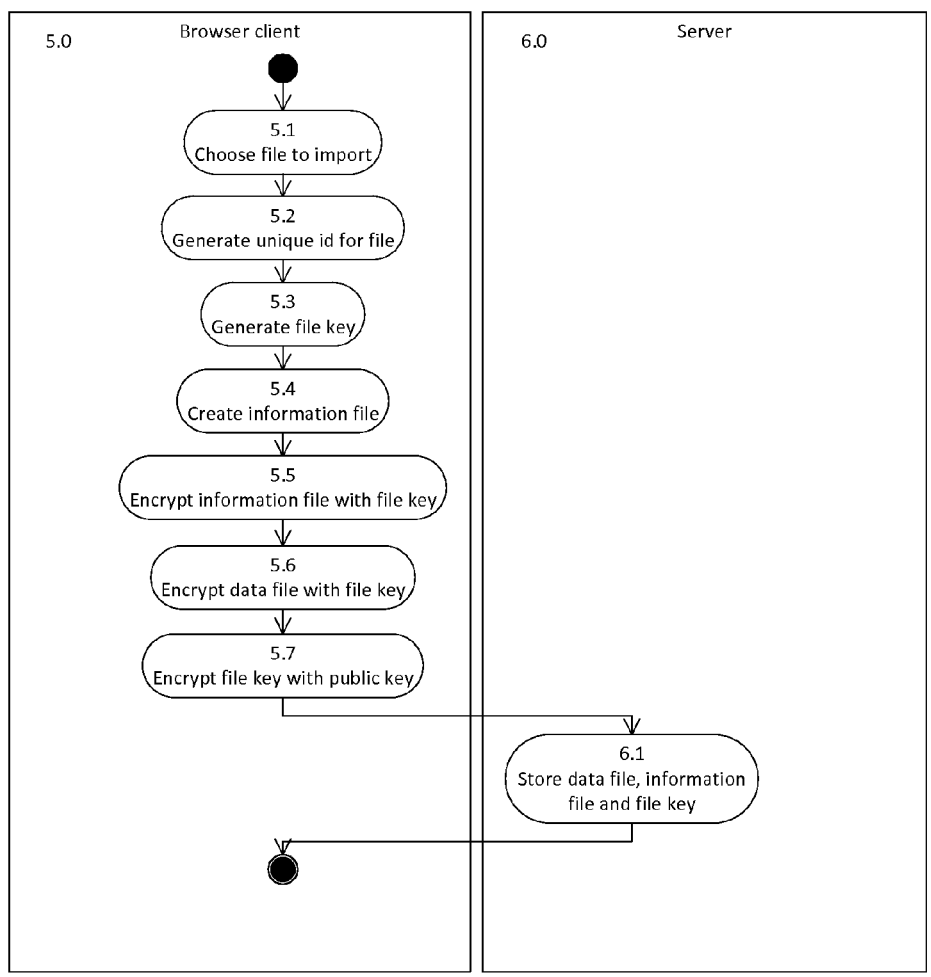
FIG. 6 is a Flow diagram showing the Browser Client-Server communication related to the process of the user storing an encrypted file on the server.

The user may follow a scheme as described in FIG. 6 to select and store data file and associated information. The frames 5.0 and 6.0 represent the communication on the user's browser client and the server respectively.

The browser client component presents in an embodiment of the invention functionality to the user for choosing a file (5.1) from the users file system to be imported to the server. When file is selected, a unique id for the file is generated (5.2), and a file key is generated (5.3). This file key is preferably a symmetric encryption key, for example a 256 bit AES (Advanced Encryption Standard) key. An information file is created (5.4) comprising metadata from the chosen file (5.1). These metadata may comprise information such as file name, file creation data, file size, date of last change and more. The information file may also comprise specific information generated by the user and/or the invention application, either by the browser client or the server. Such information may comprise: file-ID, parent folder id of the chosen file (5.1), description of the chosen file in readable text, and other.

The information file is encrypted (5.5) with the file key generated (5.3) for the chosen file. The chosen file (5.1), hereafter called the data file is then encrypted (5.6) with the same file key.

The file key gets encrypted (5.7) with the user's public key. The encrypted data file (5.6), the encrypted information file (5.5) and the encrypted file key (5.7) are stored (6.1) on the server.

The browser client receives an acknowledgement of successful operation of storing (6.1) the encrypted data file (5.6), the encrypted information file (5.5) and the encrypted file key (5.7) on the server.

Figure 7:
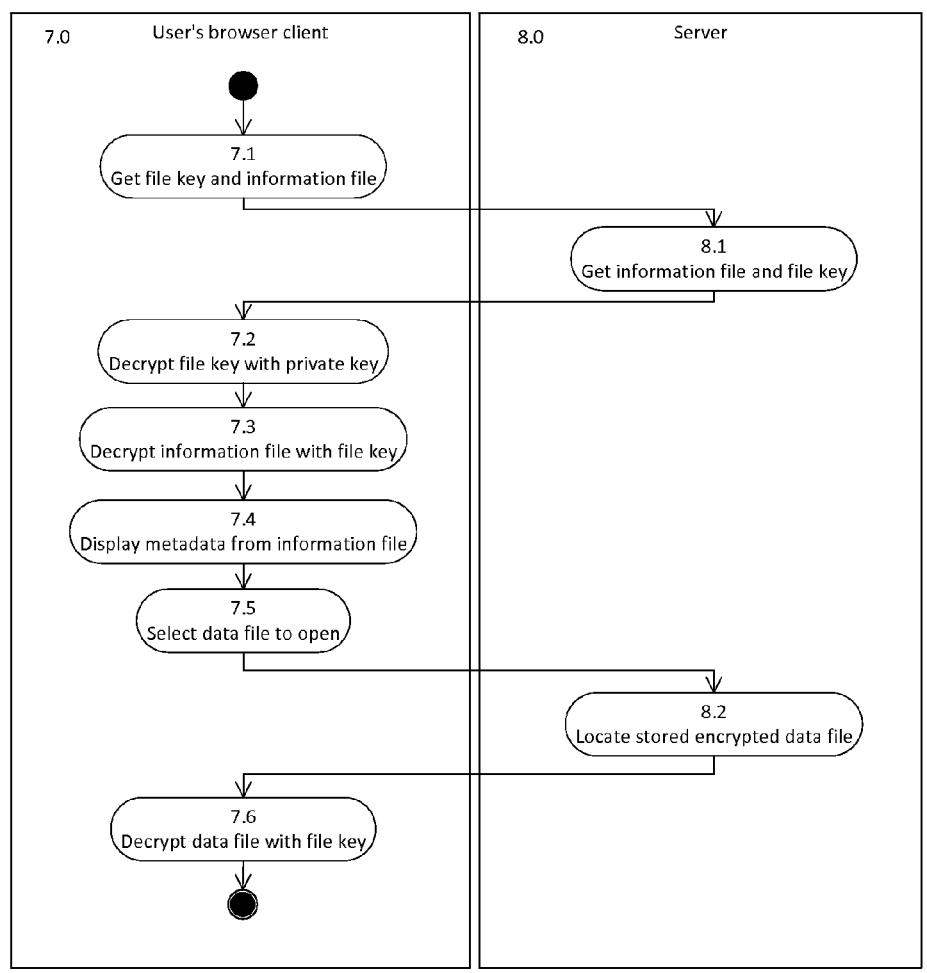
FIG. 7 is a Flow diagram showing the Browser Client-Server communication related to the process of the user retrieving an encrypted file from the server.

The user may follow a scheme as described in FIG. 7 to select, download and access a data file and associated information stored on the server. The frames 7.0 and 8.0 represent the communication on the user's browser client and the server respectively.

In one embodiment of the invention, when user has logged in as described above and illustrated in FIG. 5, the available data files stored on the server is presented to the user through the browser client. The user then selects (7.1) what file to get file key and information file from the server for. This request is then handled by the server (8.1) which transfer the encrypted information file and the encrypted file key to the browser client. The browser client in turn decrypt (7.2) the file key with the private key of the key pair (1.4). Once the file key is available the file key is used to decrypt the information file (7.3) containing the meta data of the data file. These metadata from the information file may then be displayed (7.4) to the user. The user may then be able to view the displayed information, and is able to select (7.5) which data file to download and open. Upon selecting data file to download and open, the request is handled by the server by locating (8.2) the stored encrypted data file which is in turn sent to the browser client, which in turn will decrypt the data file (7.6) with the file key. The user may then be able to view the data file content.

Figure 8:
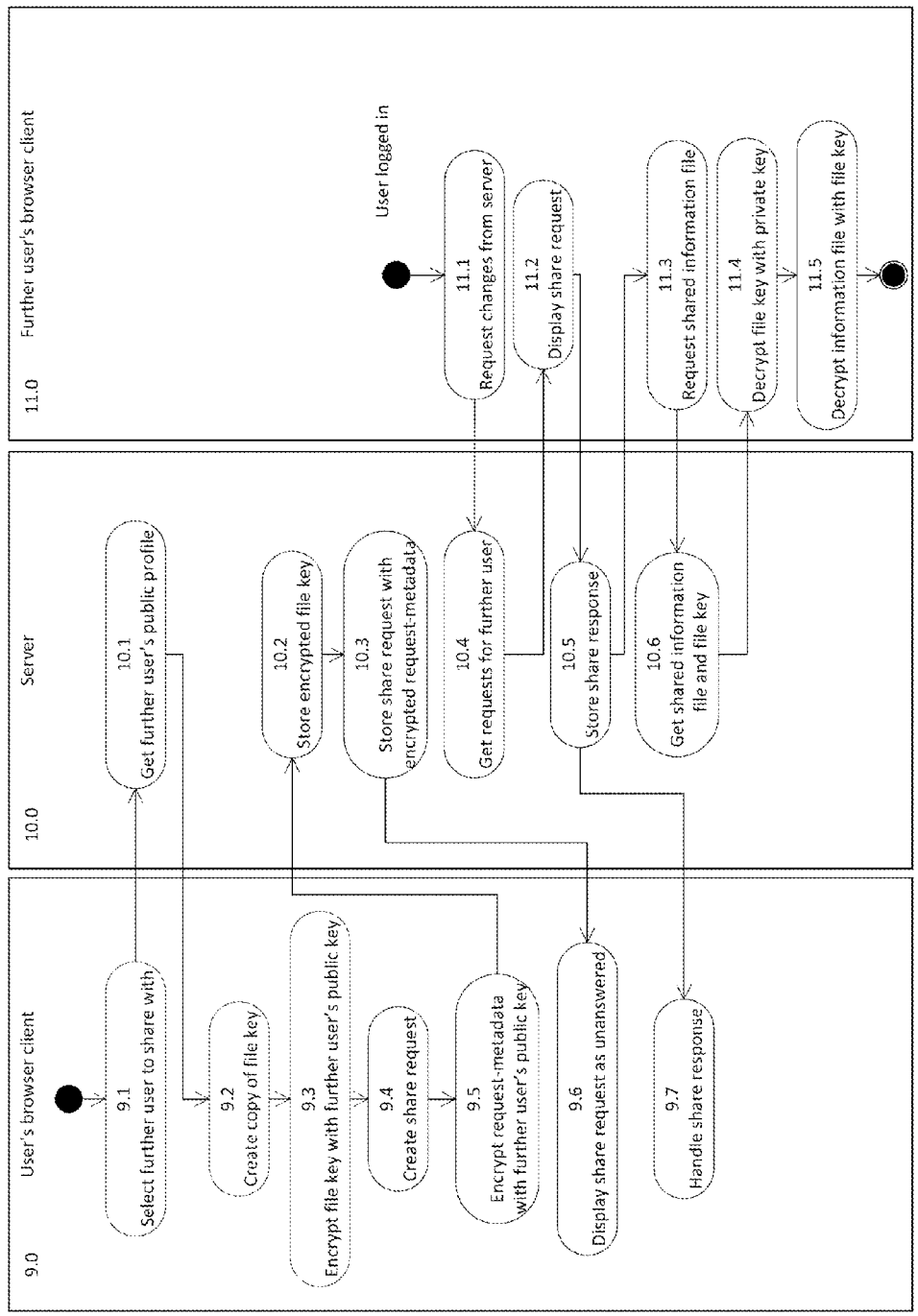
FIG. 8 is a Flow diagram showing the Browser Client-Server-Further user communication related to the process of the user identifying/selecting a further user to share data file, information file and file key with and to exchange the actual information file and file key.

The user may follow a scheme as described in FIG. 8 to identify/select a further user with whom the user wants to share specific file with. The frames 9.0, 10.0 and 11.0 represent the communication on the user's browser client, the server and the further user's browser client respectively.

In one embodiment of the invention there are one or several further users prequalified to be selectable identified by user to be allowed to get access to selected encrypted files on the server. When a user needs to share one or more files the user will use the user's browser client function for selecting a further user of the prequalified selectable further users to select further user (9.1) to share with. The server then provides (10.1) the further user's public profile which is sent to the user's browser client. The user's browser client creates a copy (9.2) of the file key associated with the selected file, and then the user's browser client encrypts the file key (9.3) with the further user's public key comprised in the further user's public profile. The user then selects to create a share request (9.4). The user may now be allowed to include some descriptive information about the file intended to be shared with the further user. These metadata may also comprise other information such as a more descriptive name of the shared file instead of only the file name. The metadata is encrypted with the further user's public key (9.5). The request is then sent to the server which store the encrypted file key (10.2) and the share request comprising the metadata (10.3). A status report is sent to the user's browser client identifying and displaying the share request as unanswered (9.6).

In this embodiment nothing happens with the share request until the further user logs in to the invention application at the server, optionally following the logic explained in FIG. 4 and FIG. 5. Upon successful login the further user's browser client sends a request for changes from the server (11.1). When the server receives the request for changes (10.4) from the further user's browser client, the server responds with sending the share request from the user. The share request is then displayed (11.2) by the further user's browser client. Only the acceptance of such request is exemplified by the FIG. 8, but it may be an option to deny the share request, whereupon such denial is shared with the user and subsequently logged and/or deleted in the server. The server stores the acceptance of the share response (10.5). When user next time is connected to the server the share request response is transferred (9.7) to the user's browser client for handling.

When share is accepted by the further user the component running on the further user's browser client may request the information file (11.3) from the server. The server provides (10.6) the encrypted (9.5) metadata and the encrypted (9.3) file key and thus the further user browser client can decrypt (11.4) the file key using the further user's private key, and decrypt (11.5) the information file (9.5) with the decrypted file key (11.4). The further user's browser client now displays the metadata describing the data file that is shared by the user. The further user can now access and download selected data file and information file using the same procedure as described in frames 7.0 and 8.0 where the select, download and access data file and information file are described. The further user replaces the role of the user in FIG. 7, and the further user's browser client replaces the user's browser client.

Figure 9:
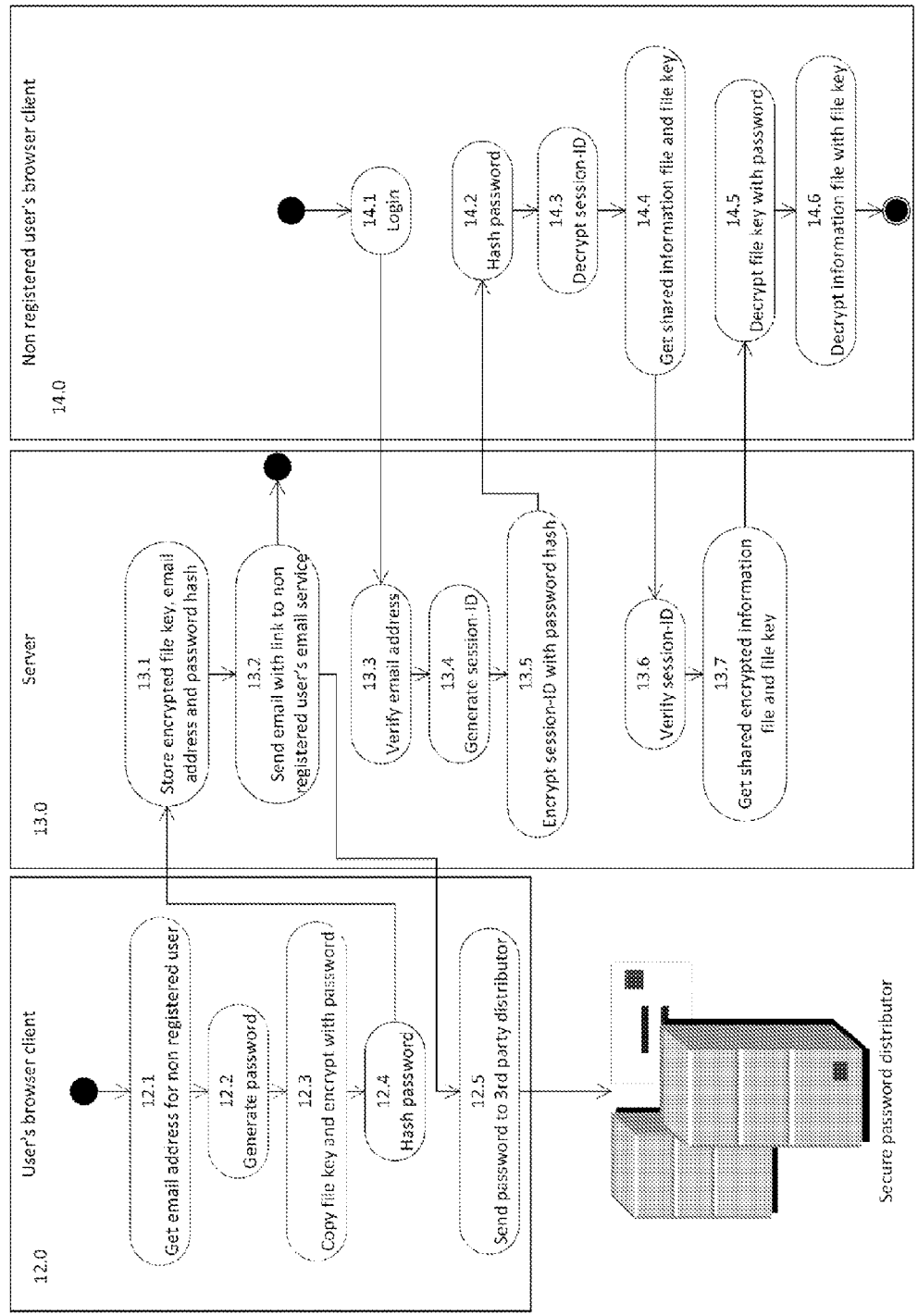
FIG. 9 is a Flow diagram showing the Browser Client-Server-Non registered further user communication related to the process of the user identifying/selecting a nonregistered further user to share data file, information file and file key with, and the process for the nonregistered further user to be authenticated by Server, and to exchange the actual information file and file key.

The user may follow a scheme as described in FIG. 9 to define a non registered user with whom the user wants to share specific file with. The frames 12.0, 13.0 and 14.0 represent the communication on the user's browser client, the server and the non registered user's browser client respectively.

In one embodiment of the invention when a user needs to share one or more files with non registered users the user will use the user's browser client function for selecting non registered user to select non registered user (12.1) to share with. Prior to the selection of non registered user to share with the user has logged in to the server application and chosen file to share with the non registered user. The non registered user may be identified by the user inputting the non registered users e-mail address. Other identification mechanisms may be chosen, such as for example selecting non registered user from a third party register. The user's browser client creates a password (12.2), alternatively let the user input a user defined password. The user's browser client makes a copy of the file key and encrypts this (12.3) with the newly generated password (12.2). The password is then hashed (12.4) by the user's browser client and sent to the server together with the encrypted (12.3) file key and the email address (12.1) of the non registered user. The server responds to the user by sending (13.2) a link to the non registered user to which the non registered user shall connect for further proceeding of accessing shared file. The server may optionally send the password hash associated with the link identifying the chosen file to share.

The user now sends the password which is unencrypted to the non registered user. This can be done by e-mail or other communication procedure. Examples of such might be a message by telephone (SMS), by letter, by orally presenting the password and/or link or others. A safe communication line for transmission of the password to the non-registered user, e.g. a secure e-mail service, may be used.

When the non registered user receives the login link the non registered user will when connecting (14.1) to the server receive the web interface together with appropriate components for communication and operation of the services of authentication and download of file. The first operation of the non registered user when connected is to log in (14.1) to the server. The server then verifies the email address of the non registered user and compares (13.3) this with the address received (13.1) from the user, followed by an optional check of the password hash that is transmitted from the non registered user to the server in the login sequence that is used to identify the file selected for share. Upon successful comparison, the server generates a session-ID (13.4) which is encrypted (13.5) with the password hash that was received (13.1) from the user. The session-ID is sent to the non registered user. The non registered user's browser client performs a hash (14.2) of the password received from the user (12.5). The non registered user's browser client use the hashed password to decrypt (14.3) the session-ID received (13.5) from the server. The non registered user may now request information file and the encrypted (12.3) file key by sending a request for this together with the decrypted (14.3) session-ID. When the server receives this request (13.6), the server perform the second stage of the authentication operation by verifying (13.6) the received session-ID and compare it with the generated (13.4) session-ID. If the comparison is successful, the server transmits (13.7) the shared encrypted information file and the file key. The encrypted file key is then decrypted (14.5) by the non registered user with the password received from the user (12.6). When the file key is decrypted, the file key is used to decrypt (14.6) the information file. Now the non registered user's browser client can display the metadata of the information file, and the non registered user is able to download, decrypt and access the shared data files. The non registered user can now access and download selected data file using the same procedure as described in frames 7.0 and 8.0 where the select, download and access data file and information file are described. The non registered user replaces the role of the user in FIG. 7, and the non registered user's browser client replaces the user's browser client.

Figure 10:
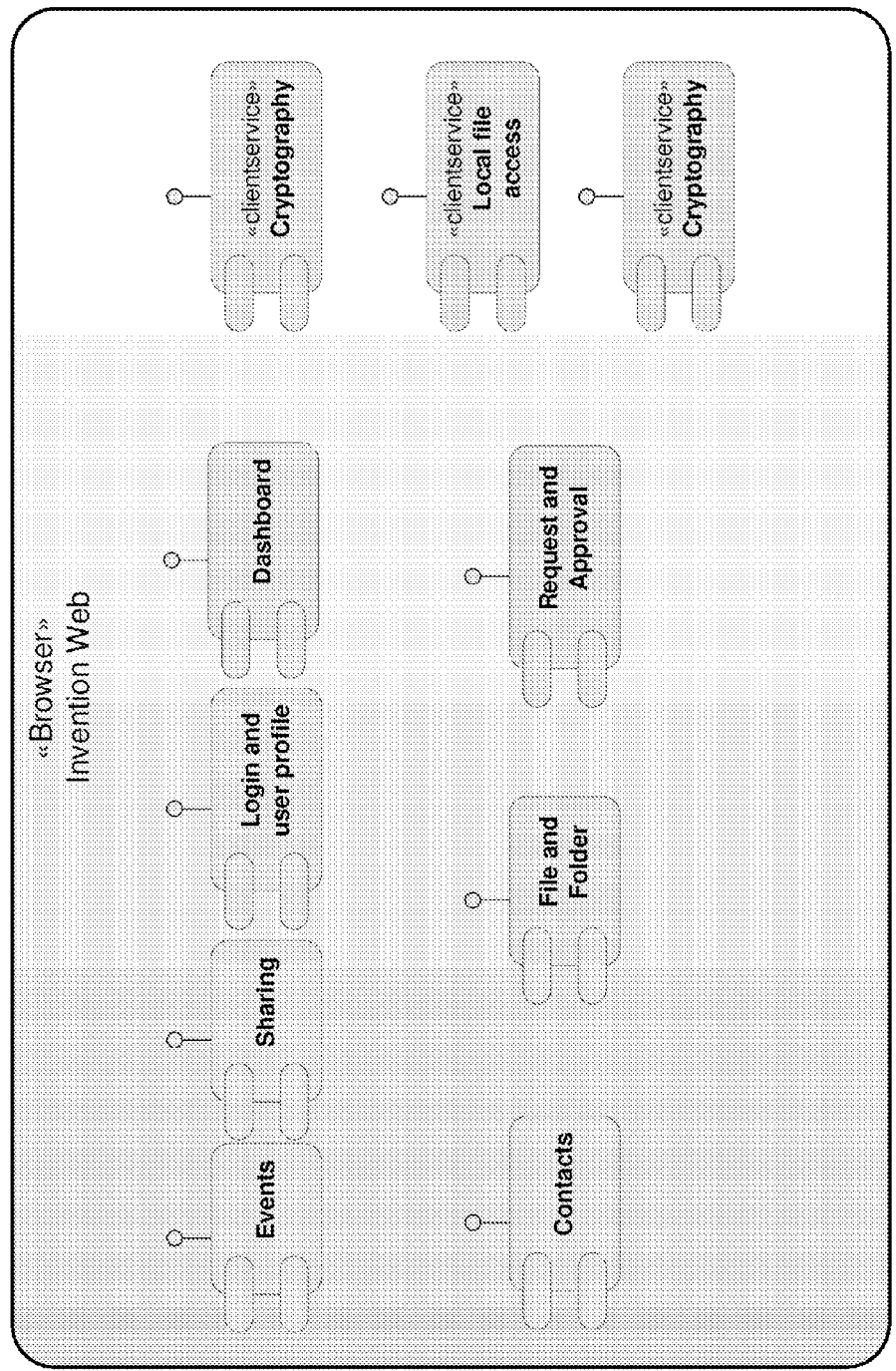
FIG. 10 is a principle outline of logical architecture.
Figure 11:
FIG. 11 is an example graphical user interface of a user "Dashboard".
Figure 12:
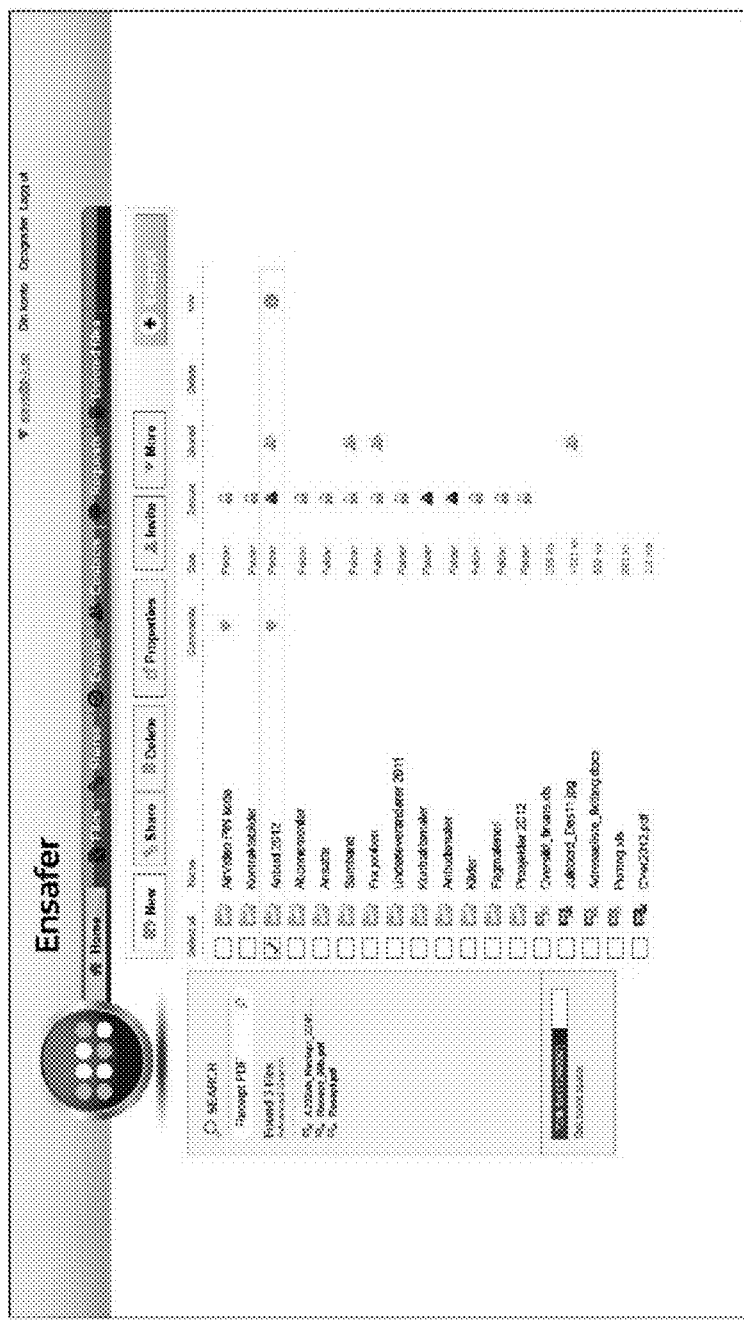
FIG. 12 is an example graphical user interface of a user "File/Folder share menu".
Figure 13:
FIG. 13 is an example graphical user interface of a user "Share overview".
Figure 14:
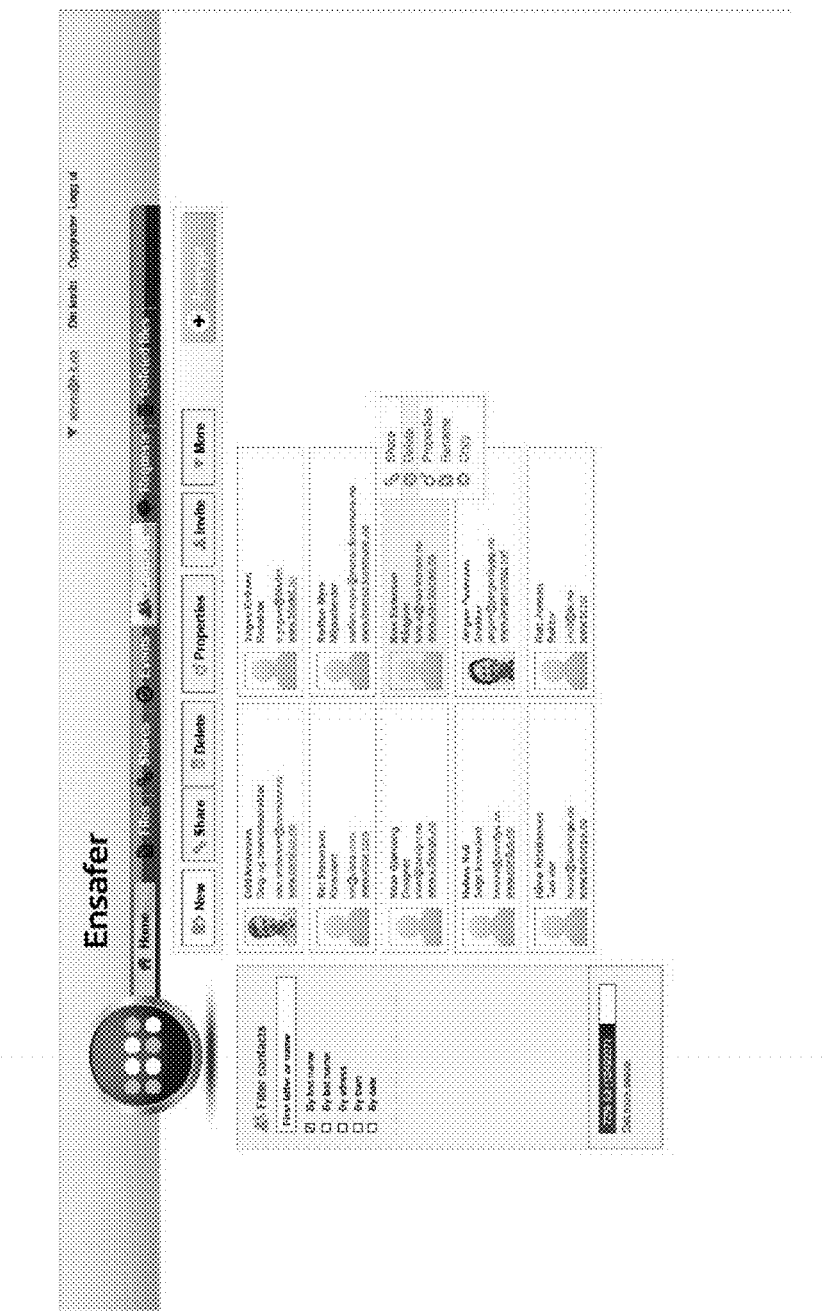
FIG. 14 is an example graphical user interface of a user "Contact management".

The communication and exchange of information between user and server, and Further user/Non-registered user and server in current invention are defined by several components. FIG. 10 shows some of these components that may be downloaded to client for execution on the client computer when associated information is to be provided by the client.

It will be understood that the sequence or order of method steps described above has been presented for explanatory purposes, and that the same result, in certain cases, may be achieved with sequences that depart from what has been specifically described. For instance, any steps that are performed independent of each other may be performed in any order, or even simultaneously or concurrently.

Although the invention has been specified in the above as relating to a computer-implemented method, the skilled person will readily realize that the invention may also be embodied in the form of a computer program, which may be loaded into a memory in the server 1. Such a computer program includes processing instructions which enables the server 1 to perform the disclosed method when the instructions are executed by a processing device in the server 1. It will also be understood that the invention may be embodied as the server 1, when the server 1 is configured to (e.g. programmed to) perform the disclosed method.

It should be understood that the described method, server and computer program technically correspond to each other, and that any feature that has been described specifically for the method, should be considered as also being disclosed with its counterpart in the description of the server or computer program, and vice versa.

The invention claimed is:

1. A computer implemented method for secure storing of a data file in a server computer via a computer communication network, comprising the steps of:
   providing a computer device of a user with code for:
      providing a unique user name for the user;
      asking the user for a password;
      generating an asymmetric key pair for the user having one public key and one private key;
      encrypting the private key of the user by means of a hash of the password, resulting in an encrypted private key;
      generating a file-specific symmetric key specific for the data file;
      encrypting the data file by means of the file-specific symmetric key, resulting in an encrypted data file;
      encrypting the file-specific symmetric key by means of the public key of the user, resulting in an encrypted file-specific symmetric key;
   where the code is executed by a web browser on the computer device;
      receiving the encrypted data file, the encrypted file-specific symmetric key, the encrypted private key of the user and the public key of the user from the computer device;
      storing the encrypted data file and the encrypted file-specific symmetric key in a file management system;
      storing the public key of the user and the encrypted private key of the user in a user management system;
   providing the computer device of the user with code for:
      providing an indication of which data file to share;
      asking the user for an e-mail address of a non-registered user to share the data file with;
      generating a password for the non-registered user;
      sending the password to the non-registered user;
      providing a hash of the password of the non-registered user by means of a hash function;
      generating a file-specific symmetric key specific for the data file;
      encrypting the file-specific symmetric key by means of the password,
   where the code is executed by the web browser on the computer device;
      receiving the indication of which data file to share, the e-mail address, the hash of the password and the encrypted file-specific symmetric key;
      sending an e-mail to the e-mail address of the non-registered user containing a link to a page on the server;
   where, when the nonregistered user is opening the link, the server is providing the non-registered user with code for:
      asking the non-registered user for the e-mail address and the password;
      providing a hash of the password by means of the hash function,
   where the code is executed by the web browser on the computer device of the non-registered user;
      receiving the e-mail address and the hash of the password from the non-registered user;
      generating a unique session-ID;
      encrypting the session-ID by means of the hash of the password of the non-registered user;
      sending the encrypted session-ID to the computer device of the non-registered user;
      providing the non-registered user with code for:
         decrypting the encrypted session-ID by means of the hash of the password,
   where the code is executed by the web browser on the computer device;
      receiving the session-ID from the computer device of the non-registered user;
      comparing the received session-ID with the generated session-ID;
      sending the encrypted file-specific symmetric key and the encrypted data file to the computer device of the non-registered user if the received session-ID is identical to the generated session-ID;
      providing the non-registered user with code for:
         decrypting the encrypted file-specific symmetric key by means of the password; and
         decrypting the encrypted data file by means of the decrypted file-specific symmetric key,
   where the code is executed by the web browser on the computer device.

2. Method according to claim 1, further comprising the steps of:
   providing the computer device of the user with code for:
      generating an information file with information about the data file;
      encrypting the information file by means of the file-specific symmetric key;
   where the code is executed by the web browser on the computer device;
      receiving the encrypted information file; and
      storing the encrypted information file in the file management system.

3. Method according to claim 2, where the information about the data file comprises at least one of the following elements: a file creation date, a file name, a unique file identifier, created timestamp, modified timestamp, and a file size.

4. Method according to claim 1, where, upon receiving a login request comprising the unique user name from the computer device, the method comprises the following steps:
identifying the user by means of the unique user name;
generating a unique session-ID;
encrypting the session-ID by means of the public key of the user;
sending the encrypted private key of the user to the computer device;
sending the encrypted session-ID to the computer device;
providing the computer device of the user with code for:
asking the user for the password;
decrypting the encrypted private key by means of the hash of the password;
decrypting the encrypted session-ID by means of the private key;
where the code is executed by the web browser on the computer device;
receiving the session-ID from the computer device;
comparing the received session-ID with the generated session-ID;
accepting the login request if the received session-ID is identical to the generated session-ID.

5. Method according to claim 4, where, upon receiving a data file request from the computer device, the method comprises the following steps:
sending the encrypted data file to the computer device;
sending the encrypted file-specific symmetric key to the computer device;
providing the computer device with code for:
decrypting the encrypted file-specific symmetric key by means of the private key;
decrypting the encrypted data file by means of the decrypted file-specific symmetric key;
where the code is executed by the web browser on the computer device.

6. Method according to claim 2, further comprising the steps of:
sending the encrypted information file to the computer device;
providing the computer device with code for:
decrypting the encrypted information file by means of the decrypted file-specific symmetric key;
where the code is executed by the web browser on the computer device.

7. Method according to claim 1, further comprising the step of:
receiving a contact request from the computer device of the user for establishing contact between the user and a further user;
sending a confirmation request to the further user;
receiving an acceptance of the confirmation request from the further user;
storing contact information about the contact between the user and the further user in the user management system.

8. Method according to claim 4, further comprising:
providing the computer device of the user with code for:
providing an indication of a further data file to share;
providing an indication of a further user to share the further data file with;
where the code is executed by the web browser on the computer device;
receiving the indication of which further data file to share and the indication of the further user to share the data file with;
sending the public key of the further user to the computer device;
sending the encrypted file-specific symmetric key for the data file to the computer device;
providing the computer device of the user with code for:
decrypting the encrypted file-specific symmetric key by means of the private key;
encrypting the decrypted file-specific symmetric key as a further file-specific symmetric key by means of the public key of the further user;
where the code is executed by the web browser on the computer device;
receiving the encrypted further file-specific symmetric key;
storing the encrypted further file-specific symmetric key in the file management system.

9. Method according to claim 8, where, upon receiving a data file request from the computer device of the further user, the method comprises the following steps:
sending the encrypted data file to the computer device;
sending the encrypted further file-specific symmetric key to the computer device;
providing the computer device with code for:
decrypting the encrypted further file-specific symmetric key by means of the private key;
decrypting the encrypted data file by means of the decrypted further file-specific symmetric key;
where the code is executed by the web browser on the computer device.

10. The method according to claim 1, where the password is sent to the non-registered user by an e-mail application installed on the computer device of the user.

11. The method according to claim 1, where the password is sent to the non-registered user by a SMS.

12. Server computer, configured to perform a method as set forth in claim 1.

13. Method according to claim 2, where, upon receiving a login request comprising the unique user name from the computer device, the method comprises the following steps:
identifying the user by means of the unique user name;
generating a unique session-ID;
encrypting the session-ID by means of the public key of the user;
sending the encrypted private key of the user to the computer device;
sending the encrypted session-ID to the computer device;
providing the computer device of the user with code for:
asking the user for the password;
decrypting the encrypted private key by means of the hash of the password;
decrypting the encrypted session-ID by means of the private key;
where the code is executed by the web browser on the computer device;
receiving the session-ID from the computer device;
comparing the received session-ID with the generated session-ID;
accepting the login request if the received session-ID is identical to the generated session-ID.

14. Method according to claim 3, where, upon receiving a login request comprising the unique user name from the computer device, the method comprises the following steps:
identifying the user by means of the unique user name;

generating a unique session-ID;
encrypting the session-ID by means of the public key of the user;
sending the encrypted private key of the user to the computer device;
sending the encrypted session-ID to the computer device;
providing the computer device of the user with code for:
  asking the user for the password;
  decrypting the encrypted private key by means of the hash of the password;
  decrypting the encrypted session-ID by means of the private key;
where the code is executed by the web browser on the computer device;
  receiving the session-ID from the computer device;
  comparing the received session-ID with the generated session-ID;
  accepting the login request if the received session-ID is identical to the generated session-ID.

15. Method according to claim 5, further comprising the steps of:
sending the encrypted information file to the computer device;
providing the computer device with code for:
  decrypting the encrypted information file by means of the decrypted file-specific symmetric key;
where the code is executed by the web browser on the computer device.

16. Method according to claim 4, further comprising the step of:
receiving a contact request from the computer device of the user for establishing contact between the user and a further user;
sending a confirmation request to the further user;
receiving an acceptance of the confirmation request from the further user;
storing contact information about the contact between the user and the further user in the user management system.

17. The method according to claim 1, where the password is sent to the non-registered user by a MMS.

18. A system for secure storing and sharing of a data file via a computer communication network, the system executing the method of claim 1, the system comprising:
a server computer,
a computer communication network,
a user computer, and
a non-registered user computer.

* * * * *